United States Patent [19]
De Aquiar

[11] Patent Number: 5,857,824
[45] Date of Patent: Jan. 12, 1999

[54] DIRT BIKE CARRIER

[76] Inventor: Henry L De Aquiar, 94-785 Meahale, Waipahu, Hi. 96797

[21] Appl. No.: 851,580

[22] Filed: May 5, 1997

[51] Int. Cl.[6] .................................................. B60P 9/00
[52] U.S. Cl. ......................... 414/462; 224/503; 224/509; 224/924
[58] Field of Search .......................... 414/462; 224/495, 224/499, 502, 503, 504, 505, 506, 509, 924

[56] References Cited

U.S. PATENT DOCUMENTS

| | | | |
|---|---|---|---|
| 4,640,658 | 2/1987 | Webb, Jr. | 414/462 |
| 5,137,411 | 8/1992 | Eul et al. | 414/462 |
| 5,427,289 | 6/1995 | Ostor | 414/462 |
| 5,431,522 | 7/1995 | Ross | 414/462 |
| 5,456,564 | 10/1995 | Bianchini | 414/462 |
| 5,518,159 | 5/1996 | Deguevara | 224/924 |
| 5,529,231 | 6/1996 | Burgess | 224/924 |
| 5,658,119 | 8/1997 | Allsop et al. | 414/462 |
| 5,699,985 | 12/1997 | Vogel | 224/924 |

*Primary Examiner*—Karen M. Young
*Assistant Examiner*—Douglas Hess
*Attorney, Agent, or Firm*—Michael I Kroll

[57] ABSTRACT

A dirt bike carrier (10) for a hitch receiver (12) under a rear bumper (14) in a motor vehicle (16) comprising a box tube (18) having a first end (20) mounted within the hitch receiver (12). A stanchion (22) is provided. A structure (24) is for turning a first end (26) of the stanchion (22) being at a right angle to a second end (28) of the box tube (18), so that the stanchion (22) can go from a horizontal position "A" into a vertical position "B". A support frame (30) maintains a dirt bike (32) thereon. A facility (34) is for pivoting the support frame (30) centrally to a second end (36) of the stanchion (22), so that the support frame (30) can go from a lowered horizontal position "C" to a raised horizontal position "D", with the dirt bike (32) thereon.

18 Claims, 6 Drawing Sheets

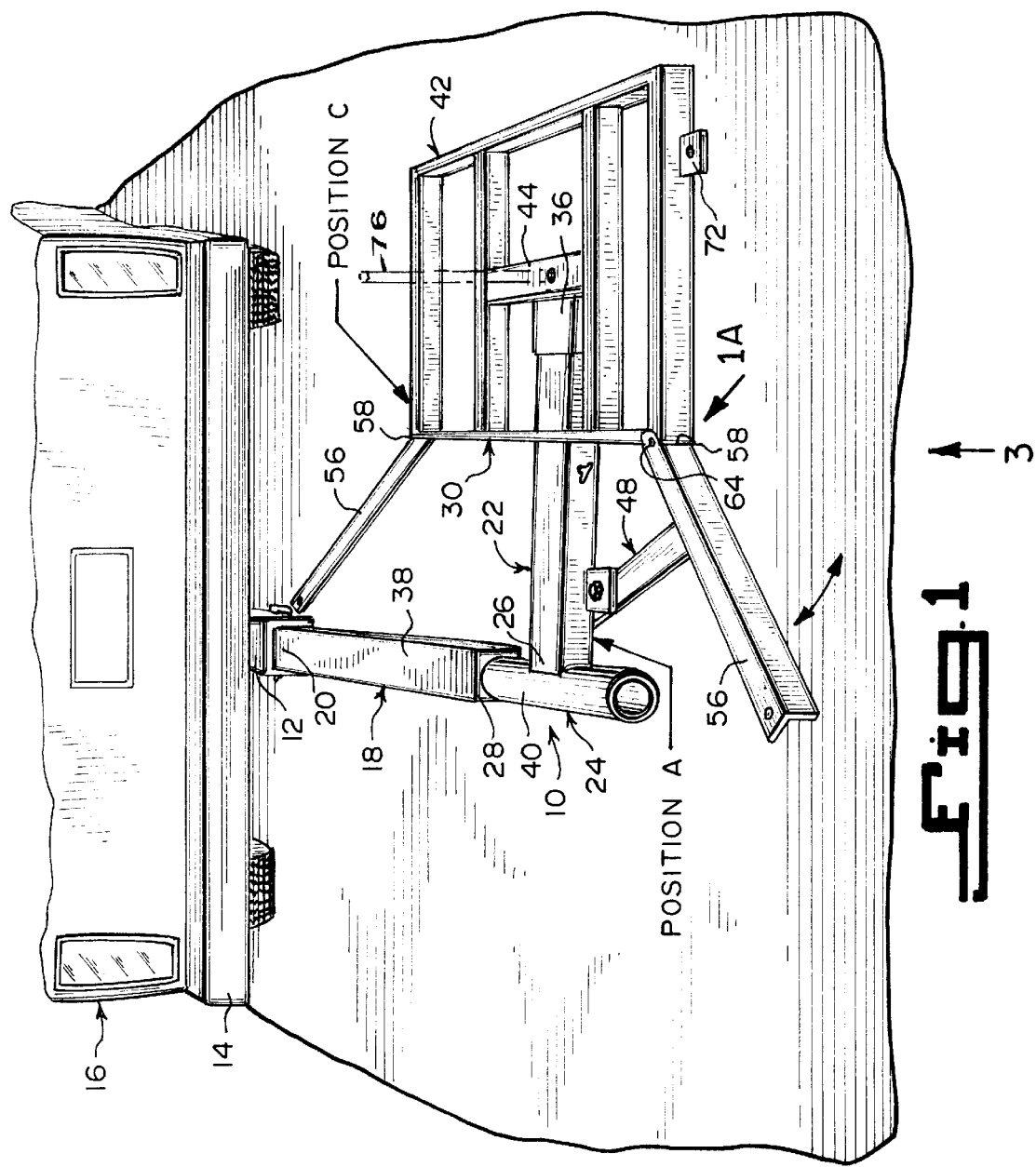

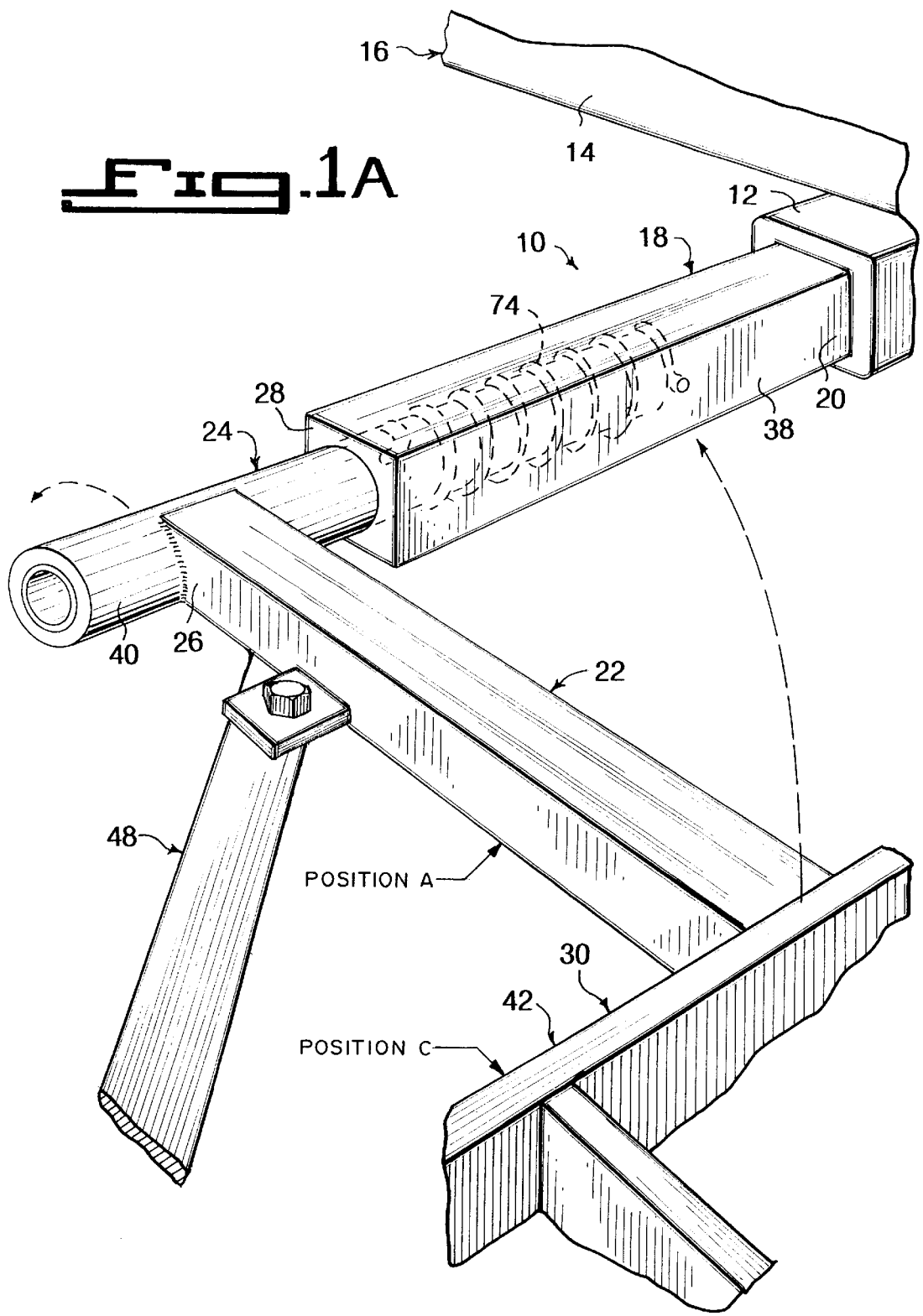

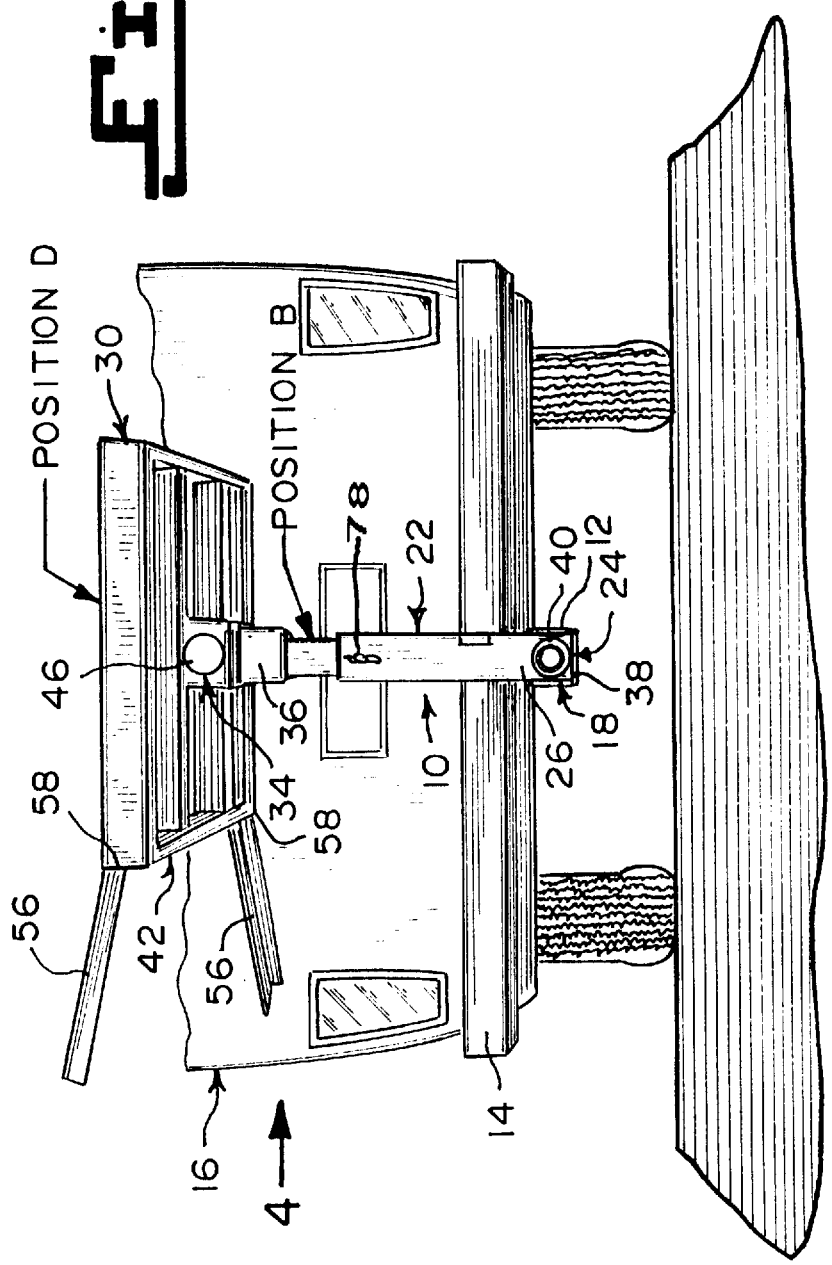

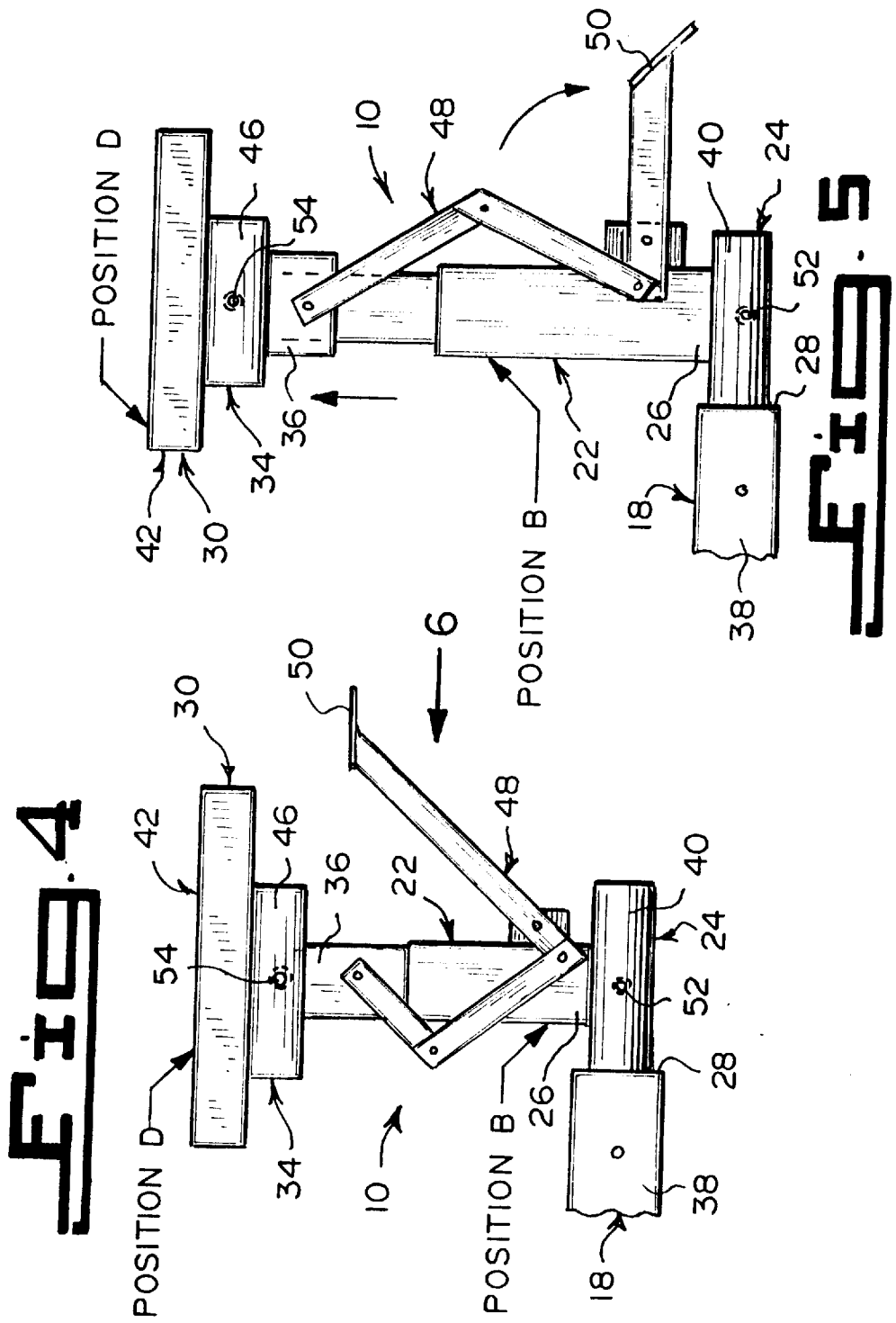

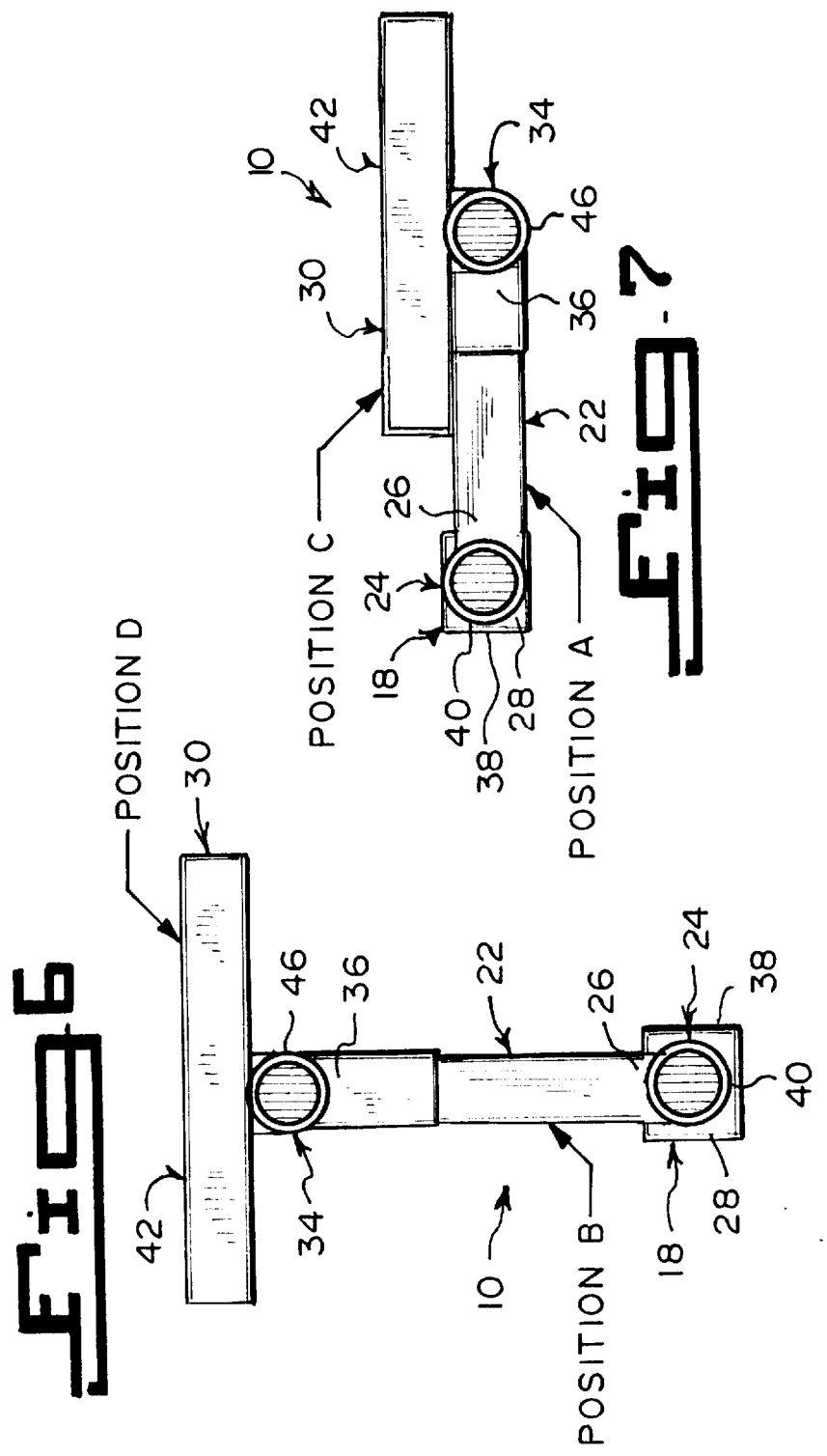

DIRT BIKE CARRIER

BACKGROUND OF THE INVENTION

1. Field of the Invention

The instant invention relates generally to bumper hitches and more specifically it relates to a dirt bike carrier. The dirt bike carrier that will mount with a hitch receiver on a motor vehicle and will not compress the suspension system on the dirt bike.

2. Description of the Prior Art

Numerous bumper hitches have been provided in prior art that are adapted to be attached to motor vehicles, so that the motor vehicles can tow most boats, utility trailers and small/medium camping trailers therefrom. While these units may be suitable for the particular purpose to which they address, they would not be as suitable for the purposes of the present invention as heretofore described.

SUMMARY OF THE INVENTION

A primary object of the present invention is to provide a dirt bike carrier that will overcome the shortcomings of the prior art devices.

Another object is to provide a dirt bike carrier that will mount with a hitch receiver on a motor vehicle to securely hold the dirt bike and will not scratch or dent the finish of the motor vehicle.

An additional object is to provide a dirt bike carrier that is compact, lightweight and will not compress the suspension system on the dirt bike.

A further object is to provide a dirt bike carrier that is simple and easy to use.

A still further object is to provide a dirt bike carrier that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 1 is a perspective view of a rear portion of a motor vehicle with parts broken away, showing the instant invention installed to a hitch receiver and the stanchion being in a generally horizontal position.

FIG. 1A is an enlarged perspective view taken in the direction of arrow 1A in FIG. 1 with parts broken away.

FIG. 2 is a perspective view of the rear portion of the motor vehicle with parts broken away, showing the stanchion being in a generally extended vertical position.

FIG. 4 is a side view taken in the direction of arrow 4 in FIG. 2, with parts broken away and before the lift mechanism is engaged.

FIG. 5 is a side similar to FIG. 4, with the lift mechanism engaged.

FIG. 6 is a front view taken in the direction of arrow 6 in FIG. 4, with the lift mechanism removed therefrom.

FIG. 7 is a front view similar to FIG. 6, but with the stanchion in its generally horizontal position.

Similar reference characters denote corresponding features consistently throughout the attached drawings.

DETAILED DESCRIPTION OF THE PREFERRED EMBODIMENTS

Figure 3:
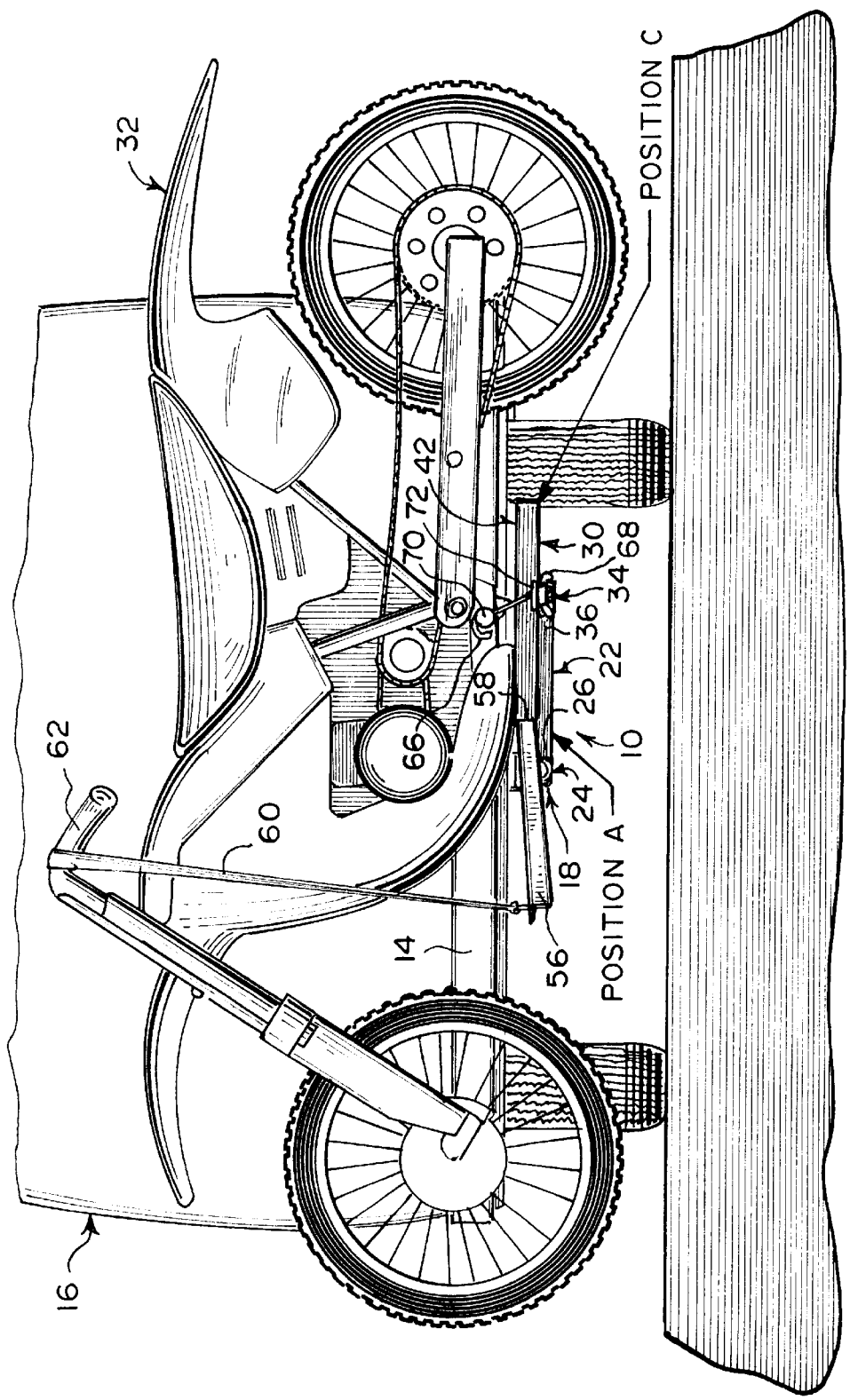
FIG. 3 is a rear elevational view taken in the direction of arrow 3 in FIG. 1, with the dirt bike installed in place.

Turning now descriptively to the drawings, in which similar reference characters denote similar elements throughout the several views, FIGS. 1 through 7 illustrate a dirt bike carrier 10 for a hitch receiver 12 under a rear bumper 14 in a motor vehicle 16, comprising a box tube 18 having a first end 20 mounted within the hitch receiver 12. A stanchion 22 is provided. A structure 24 is for turning a first end 26 of the stanchion 22 being at a right angle to a second end 28 of the box tube 18, so that the stanchion 22 can go from a horizontal position "A" into a vertical position "B". A support frame 30 maintains a dirt bike 32 thereon. A facility 34 is for pivoting the support frame 30 centrally to a second end 36 of the stanchion 22, so that the support frame 30 can go from a lowered horizontal position "C to a raised horizontal position "D" with the dirt bike 32 thereon.

The box tube 18 is an elongated hollow rectangular shank 38. The turning structure 24 is a rotatable pipe assembly 40, extending outwardly from the second end 28 of the box tube 18 and has the first end 26 of the stanchion 22 affixed to a side of the rotatable pipe assembly 40.

The support frame 30 is a grate platform 42, having a central crossbar 44. The pivoting facility 34 is a swivel joint 46 between the second end 36 of the stanchion 22 and the central crossbar 44 of the grate platform 42.

The dirt bike carrier 10 further includes the stanchion 22 being extendable. A manually operated lift mechanism 48, as best shown in FIGS. 4 and 5, is connected to the stanchion 22. The manually operated lift mechanism 48 when depressed at a foot pedal 50, will raise the stanchion 22 and the support frame 30 after the stanchion 22 goes into the vertical position "B".

A first spring loaded lock pin 52 is in the rotatable pipe assembly 40, to keep the stanchion 22 in the vertical position "B". A second spring loaded lock pin 54 in the swivel joint 46, keeps the grate platform 42 in its raised horizontal position "D".

The dirt bike carrier 10 further contains a pair of arms 56. Each arm 56 angularly extends from the support frame 30 at one corner 58 on one side thereof. A tie down strap 60, as shown in FIG. 3, can be connected between distal free ends of the arms 56 and over the handlebar 62 of the dirt bike 32, to retain the dirt bike 32 in a stationary manner thereto. The arm 56 furthest away from the motor vehicle 16 can have a swivel pin 64 in the corner 58 of the support frame 30, for easier loading of the dirt bike 32 onto the support frame 30. A hooked bolt 66 with a wing nut 68 secures a foot peg 70 on the dirt bike 32 to a flange 72 on the support frame 30. A preload spring 74, as shown in phantom in FIG. 1A, is carried within the box tube 18 and is connected to the rotatable pipe assembly 40, to help in lifting the stanchion 22 to the vertical position "B".

In a modified embodiment, the dirt bike carrier 10 can be converted into a tow truck motorcycle carrier. The grate platform 42 of the support frame 30 is now mounted directly onto the elongated hollow rectangular shank 38 of the box tube 18. The stanchion 22, the turning structure 24 and the pivoting facility 34 are not needed, they will be eliminated from the modified embodiment.

OPERATION OF THE INVENTION

To use the dirt bike carrier 10, the following steps should be taken:

1. Insert the first end 20 of the box tube 18 into the hitch receiver 12 under the rear bumper 14 in the motor vehicle 16.
2. Turn the stanchion 22 down, so that the stanchion 22 will go into the horizontal position "A".
3. Position the support frame 30 in the lowered horizontal position "C".
4. Swivel the arm 56 that is furthest away from the motor vehicle 16 on the swivel pin 64, away from the support frame 30.
5. Load the dirt bike 32 onto the support frame 30.
6. Swivel the arm 56 back to its normal position.
7. Connect the tie down strap 60 to the distal free ends of the arms 56 and over the handlebar 62 of the dirt bike 32.
8. Secure the hooked bolt 66 with the nut 38 between the foot peg 70 on the dirt bike 32 and the flange 72 on the support frame 30.
9. Turn the stanchion 22 up, so that the stanchion 22 will go into the vertical position "B".
10. Engage the first spring loaded lock pin 52 in the rotatable pipe assembly 40.
11. Position the support frame 30 in the raised horizontal position "D".
12. Engage the second spring loaded lock pin 54 in the swivel joint 46.
13. Depress the foot pedal 50 on the manually operated lift mechanism 48, to raise the stanchion 22 and the support frame 30 with the dirt bike 32, so that the motor vehicle 16 can transport the dirt bike 32 safely.

LIST OF REFERENCE NUMBERS

A horizontal position of 22
B vertical position of 22
C lowered horizontal position of 30
D raised horizontal position of 30
10 dirt bike carrier
12 hitch receiver under 14
14 rear bumper of 16
16 motor vehicle
18 box tube of 10
20 first end of 18
22 stanchion of 10
24 turning structure
26 first end of 22
28 second end of 18
30 support frame
32 dirt bike
34 pivoting facility of 10
36 second end of 22
38 elongated hollow rectangular shank for 18
40 rotatable pipe assembly for 24
42 grate platform for 30
44 central crossbar of 42
46 swivel joint for 34
48 manually operated lift mechanism for 22
50 foot pedal on 48
52 first spring loaded lock pin in 40
54 second spring loaded lock pin in 46
56 arm on 58
58 corner of 30
60 tie down strap
62 handlebar of 32
64 swivel pin in 56 on 58
66 hooked bolt
68 wing nut on 66
70 foot peg on 32
72 flange on 30
74 preload spring in 18
76 optional, removable utility rod received within 44
78 locking mechanism for extended position It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A dirt bike carrier for a hitch receiver under a rear bumper in a motor vehicle, the carrier comprising:
    a) a box tube having a first end mounted within the hitch receiver;
    b) a stanchion;
    c) means for turning a first end of said stanchion being at a right angle to a second end of said box tube, so that said stanchion can go from a horizontal position into a vertical position, said turning means being a rotatable pipe assembly extending outwardly from the second end of said box tube and having the first end of said stanchion affixed to a side of said rotatable pipe assembly;
    d) a support frame to maintain a dirt bike thereon; and
    e) means for pivoting said support frame centrally to a second end of said stanchion, so that said support frame can go from a lowered horizontal position to a raised horizontal position with the dirt bike thereon.

2. A dirt bike carrier as recited in claim 1, wherein said box tube is an elongated hollow rectangular shank.

3. A dirt bike carrier as recited in claim 2, wherein said support frame is a grate platform having a central crossbar.

4. A dirt bike carrier as recited in claim 3, wherein said pivoting means is a swivel joint between the second end of said stanchion and said central crossbar of said grate platform.

5. A dirt bike carrier as recited in claim 4, further including:
    a) said stanchion being extendable; and
    b) a manually operated lift mechanism connected to said stanchion, so that said manually operated lift mechanism when depressed at a foot pedal will raise said stanchion and said support frame after said stanchion goes into the vertical position.

6. A dirt bike carrier as recited in claim 5, further including a first spring loaded lock pin in said rotatable pipe assembly, to keep said stanchion in the vertical position.

7. A dirt bike carrier as recited in claim 6, further including a second spring loaded lock pin in said swivel joint, to keep said grate platform in its raised horizontal position.

8. A dirt bike carrier as recited in claim 7, further including a pair of arms, each said arm angularly extending from said support frame at one corner on one side thereof, so that a tie down strap can be connected between distal free ends of said arms and over the handlebar of the dirt bike, to retain the dirt bike in a stationary manner thereto.

9. A dirt bike carrier as recited in claim 8, further including:
 a) said arm furthest away from the motor vehicle having a swivel pin in said corner of said support frame for easier loading of the dirt bike onto said support frame; and
 b) a hooked bolt with a wing nut to secure a foot peg on the dirt bike to a flange on said support frame.

10. A dirt bike carrier as recited in claim 9, further including a preload spring carried within said box tube and connected to said rotatable pipe assembly to help in lifting said stanchion to the vertical position.

11. A dirt bike carrier as recited in claim 1, further including a preload spring carried within said box tube and connected to said rotatable pipe assembly to help in lifting said stanchion to the vertical position.

12. A dirt bike carrier as recited in claim 1, wherein said support frame is a grate platform having a central crossbar.

13. A dirt bike carrier as recited in claim 12, wherein said pivoting means is a swivel joint between the second end of said stanchion and said central crossbar of said grate platform.

14. A dirt bike carrier as recited in claim 13, further including a spring loaded lock pin in said swivel joint, to keep said grate platform in its raised horizontal position.

15. A dirt bike carrier as recited in claim 1, further including:
 a) said stanchion being extendable; and
 b) a manually operated lift mechanism connected to said stanchion, so that said manually operated lift mechanism when depressed at a foot pedal will raise said stanchion and said support frame after said stanchion goes into the vertical position.

16. A dirt bike carrier as recited in claim 1, further including a first spring loaded lock pin in said rotatable pipe assembly, to keep said stanchion in the vertical position.

17. A dirt bike carrier as recited in claim 1, further including a pair of arms, each said arm angularly extending from said support frame at one corner on one side thereof, so that a tie down strap can be connected between distal free ends of said arms and over the handlebar of the dirt bike, to retain the dirt bike in a stationary manner thereto.

18. A dirt bike carrier as recited in claim 17, further including:
 a) said arm furthest away from the motor vehicle having a swivel pin in said corner of said support frame for easier loading of the dirt bike onto said support frame; and
 b) a hooked bolt with a wing nut to secure a foot peg on the dirt bike to a flange on said support frame.

* * * * *